US012800080B2

(12) United States Patent
Xu et al.

(10) Patent No.: US 12,800,080 B2
(45) Date of Patent: Nov. 17, 2026

(54) QUICK-CONNECT/DISCONNECT FLUID CONNECTOR

(71) Applicant: JIAXING SHENG YANG ELECTRIC CO., LTD, Jiaxing (CN)

(72) Inventors: Xiaoyuan Xu, Jiaxing (CN); Zhihua Yu, Jiaxing (CN); Fei Cui, Jiaxing (CN)

(73) Assignee: JIAXING SHENG YANG ELECTRIC CO., LTD, Jiaxing (CN)

( * ) Notice: Subject to any disclaimer, the term of this patent is extended or adjusted under 35 U.S.C. 154(b) by 0 days.

(21) Appl. No.: 19/332,404

(22) Filed: Sep. 18, 2025

(65) Prior Publication Data

US 2026/0016106 A1 Jan. 15, 2026

Related U.S. Application Data

(63) Continuation of application No. PCT/CN2023/142721, filed on Dec. 28, 2023.

(30) Foreign Application Priority Data

Aug. 7, 2023 (CN) ........................ 202322111466.6

(51) Int. Cl.
*F16L 37/086* (2006.01)
*F16L 37/084* (2006.01)
(Continued)

(52) U.S. Cl.
CPC ............ *F16L 37/086* (2013.01); *F16L 37/32* (2013.01); *F16L 37/0841* (2013.01); *F16L 37/34* (2013.01)

(58) Field of Classification Search
CPC ..... F16L 37/086; F16L 37/32; F16L 37/0841; F16L 37/34
See application file for complete search history.

(56) References Cited

U.S. PATENT DOCUMENTS 5,406,980 A * 4/1995 Allread .................. F16L 37/32
6,089,540 A * 7/2000 Heinrichs .......... F16L 37/0841
(Continued)

FOREIGN PATENT DOCUMENTS

CN 201787244 U 4/2011
CN 202852284 U 4/2013
(Continued)

OTHER PUBLICATIONS

CN-202852284-U—Machine Translation—English (Year: 2013).*
(Continued)

*Primary Examiner* — William S. Choi
(74) *Attorney, Agent, or Firm* — HOWARD M COHN and Associates, LLC

(57) ABSTRACT

A quick-connect/disconnect fluid connector includes: a first coupling body (10) with a first pipe body (11); and a second coupling body (20) with a second pipe body (21). An elastic locking body I (14) is arranged inside the first pipe body (11), a locking body II (23) is arranged on an outer wall of the second pipe body (21), and the locking body II (23) can pass through the locking body I (14) during the insertion of the second pipe body (21) into the first pipe body (11) and is reversely abutted against the locking body I (14), thereby achieving connection and fixation between the first coupling body (10) and the second coupling body (20). The connector features simple, convenient and quick connection and disconnection, and supports blind mating.

10 Claims, 9 Drawing Sheets

(51) Int. Cl.

| | |
|---|---|
| ***F16L 37/32*** | (2006.01) |
| ***F16L 37/34*** | (2006.01) |

(56) References Cited

U.S. PATENT DOCUMENTS

| | | | | |
|---|---|---|---|---|
| 7,547,047 | B2 * | 6/2009 | deCler | F16L 37/0841 |
| 9,016,314 | B2 * | 4/2015 | Eriksen | F16L 37/32 |
| 12,007,055 | B2 * | 6/2024 | Abraham Carabano | F16L 37/086 |
| 2007/0025811 | A1 * | 2/2007 | Wilhelm | F16L 37/34 |
| 2013/0312846 | A1 * | 11/2013 | Eriksen | F16L 37/34 |
| 2020/0063904 | A1 | 2/2020 | Vranish | |
| 2021/0199223 | A1 | 7/2021 | Langer | |
| 2023/0213128 | A1 | 7/2023 | Kuo | |
| 2023/0220936 | A1 | 7/2023 | Jacobsen et al. | |
| 2024/0027008 | A1 * | 1/2024 | Frederiksen | F16L 37/1225 |
| 2024/0353040 | A1 * | 10/2024 | Cao | F16L 37/086 |

FOREIGN PATENT DOCUMENTS

| | | | |
|---|---|---|---|
| CN | 207049492 | U | 2/2018 |
| CN | 110425359 | A | 11/2019 |
| CN | 210106834 | U | 2/2020 |
| CN | 115654241 | A | 1/2023 |
| CN | 117028709 | A | 11/2023 |

OTHER PUBLICATIONS

International Search Report issued in corresponding International application No. PCT/CN2023/142721, mailed Mar. 7, 2024.

Written Opinion of the International Searching Authority for No. PCT/CN2023/142721, mailed Mar. 7, 2024.

* cited by examiner

QUICK-CONNECT/DISCONNECT FLUID CONNECTOR

TECHNICAL FIELD

The present disclosure relates to the technical field of connectors, in particular to a quick-connect/disconnect fluid connector.

BACKGROUND

A fluid connector is a device for connecting pipelines that transport high-pressure production fluids, so as to enable a relative movement between two components that carry the corresponding connecting ends of the pipelines. It can realize the quick connection or disconnection of liquid paths, and is a very important element in a liquid cooling heat dissipation system, which can ensure the quick connection and disconnection between various components in a liquid cooling system loop. Fluid connectors are widely used in liquid cooling systems for high heat dissipation electronic devices, such as liquid cooling heat dissipation systems for high-end manufacturing fields of medical treatment and aerospace as well as new energy batteries.

An example of the current fluid connector is a fluid connector as disclosed in CN217927715U, which is a slot-type liquid connector. When a male plug and a female plug are mated, a corresponding connect/disconnect direction is required, and convex points on the female plug need to be aligned with grooves on the male plug to achieve proper mating. Another example is a threaded connection leak-proof fluid connector disclosed in CN103672248A needs to be screwed down for connection by threaded rotation, which is troublesome to install and remove, thus being time-consuming and labor-consuming.

SUMMARY

In order to avoid the shortcomings of the prior art, the present disclosure provides a quick-connect/disconnect fluid connector, which achieves a blind mating effect, enables rapid connecting/disconnecting and disassembly, saves time and labor, and is convenient to operate.

The present disclosure adopts the following technical solutions to solve the technical problem: a quick-connect/disconnect fluid connector includes:

a first coupling body, including a first pipe body with a cavity distributed along the axial direction of the first pipe body, an abutting main body and a sliding main body being arranged inside the first pipe body, the abutting main body extending along the axial direction of the cavity, and the sliding main body being movable inside the cavity along the axial direction of the cavity; and a second coupling body, including a second pipe body with a flow channel distributed along the axial direction of the second pipe body, one end of the second pipe body being inserted into the first pipe body, a linkage main body being arranged inside the second pipe body, and the abutting main body being capable of pushing the linkage main body to move axially along the flow channel, where the first pipe body is internally provided with an accommodating cavity at the end where the second pipe body mates with the first pipe body, an elastic locking body I is arranged inside the accommodating cavity, a locking body II is arranged on an outer wall of the second pipe body, and the locking body II is capable of passing through the locking body I during the insertion of the second pipe body into the first pipe body and is reversely abutted against the locking body I, thereby achieving connection and fixation between the first coupling body and the second coupling body.

In several embodiments, an auxiliary pipe body is further arranged inside the cavity, one end of the auxiliary pipe body is abutted against the abutting main body, the other end of the auxiliary pipe body extends towards the accommodating cavity for formation of an outwardly expanded elastic arm at the end, a connecting groove is provided in the first pipe body, and the elastic arm is abutted against an interior of the connecting groove.

In several embodiments, the abutting main body includes a base plate and a push rod, the base plate abuts against an end portion of the first pipe body, one end of the push rod is connected to the base plate, and the other end of the push rod passes through the sliding main body.

In several embodiments, the sliding main body includes a sealing section and a guide section, and an outer diameter of the guide section is greater than that of the sealing section; and the auxiliary pipe body includes a limiting section and a movable section, the sealing end is capable of being inserted into the limiting section and fitting with an inner wall of the limiting section, while the guide section fits with an inner wall of the movable section and is movable only within the movable section.

In several embodiments, an insertion pipe is arranged in communication with an end of the first pipe body that is away from the accommodating cavity, a plurality of openings are provided in the base plate, and the openings are in communication with the insertion pipe.

In several embodiments, a first spring is sleeved over the push rod, and the first spring is retained between the base plate and the sliding main body.

In several embodiments, an end cover is further arranged at an end portion of the second pipe body, a second spring is arranged between the end cover and the linkage main body, and the linkage main body is constrained from passing through to the outside of the second pipe body.

In several embodiments, the locking body I includes a base body with a through hole in the middle, where two positioning blocks are arranged on two opposite sides of the base body in a protruding manner, two positioning holes are provided at the end portion of the first pipe body, and the positioning holes are configured to accommodate the positioning blocks;

two clamping blocks are arranged on another two opposite sides of the base body in a protruding manner, the clamping blocks are abutted against an inner wall of the accommodating cavity, two limiting blocks are arranged inside the base body, and the positions of the limiting blocks correspond to those of the clamping blocks; and the locking body II protrudes from and annularly arranged on an outer side of the second pipe body, and the locking body II is capable of unidirectionally passing through the limiting blocks and is reversely abutted against the limiting blocks.

In several embodiments, a stopper is arranged on the outer side of the second pipe body in a protruding manner, and the stopper is capable of abutting against the end portion of the first pipe body and restricting the second pipe body from continuing to move into the first pipe body.

In several embodiments, a plurality of assembly holes are reserved at one end of the second pipe body, the end cover is provided with a plurality of bumps, and the assembly holes are configured to accommodate the bumps.

The present disclosure has the following beneficial effects:

1. The present disclosure adopts a locking connect/disconnect connection structure to achieve a blind mating effect, making connecting and disconnecting simple, convenient and fast. A rigid abutment and guiding structure is adopted for internal parts during the product docking process, which avoids the misalignment of the internal parts caused by spring distortion when the first coupling body and the second coupling body are connected and disconnected.
2. The present disclosure improves an internal waterproof structure of the first coupling body, the auxiliary pipe body is fixed to the first coupling body in combination with the elastic arms, and sealing rings and the abutting main body are directly fixed inside the first coupling body, thus avoiding the problems of tilting and eccentricity of the abutting main body.
3. According to the present disclosure, two springs are adopted in each of the first coupling body and the second coupling body, so that huge instantaneous flow pulse and pressure pulse will not be generated in the process of insertion and separation of the first coupling body and the second coupling body under pressure, thus protecting the sealing rings, and further reducing the leakage of the fluid connector caused by the misoperation of connecting and disconnecting when the system pressure is not relieved. Furthermore, a lateral sealing structure is realized, and even if the first coupling body and the second coupling body are in a disconnected state, they can also achieve bidirectional sealing independently.
4. The present disclosure optimizes the connect/disconnect structure of the product, lowers the manufacturing cost, reduces the processing and assembling time, and greatly improves the production efficiency.

BRIEF DESCRIPTION OF FIGURES

The accompanying drawings described herein are for illustrative purposes only of selected embodiments and are not representative of all possible embodiments, and should not be construed as limiting the scope of the present disclosure.

DETAILED DESCRIPTION

Embodiments of the present disclosure will be described in detail below. In order to make the objects, technical solutions and advantages of the embodiments of the present disclosure clearer, the technical solutions in the embodiments of the present disclosure will be clearly and completely described below in conjunction with the embodiments of the present disclosure, and it is apparent that the described embodiments are parts of embodiments rather than all embodiments of the present disclosure.

Accordingly, the detailed descriptions of the embodiments of the present disclosure provided below are not intended to limit the scope of the claimed present disclosure, but merely represent selected embodiments of the present disclosure. All other embodiments obtained by those of ordinary skill in the art based on the embodiments of the present disclosure without creative efforts shall fall within the protection scope of the present disclosure.

The terminology used herein is intended to explain the embodiments and is not intended to limit and/or define the present disclosure.

For example, expressions such as “in a certain direction”, “along a certain direction”, “parallel”, “orthogonal”, “central”, “opposite”, “front, back, left, and right” that represent relative or absolute configurations not only indicate such configurations in a strict sense, but also indicate states of relative displacement with tolerances, or with angles or distances at which the same degree of function can be obtained.

Embodiment 1

The present disclosure provides a quick-connect/disconnect fluid connector, which achieves a blind mating effect, enables rapid connecting/disconnecting and disassembly, saves time and labor, and is convenient to operate.

Figure 1:
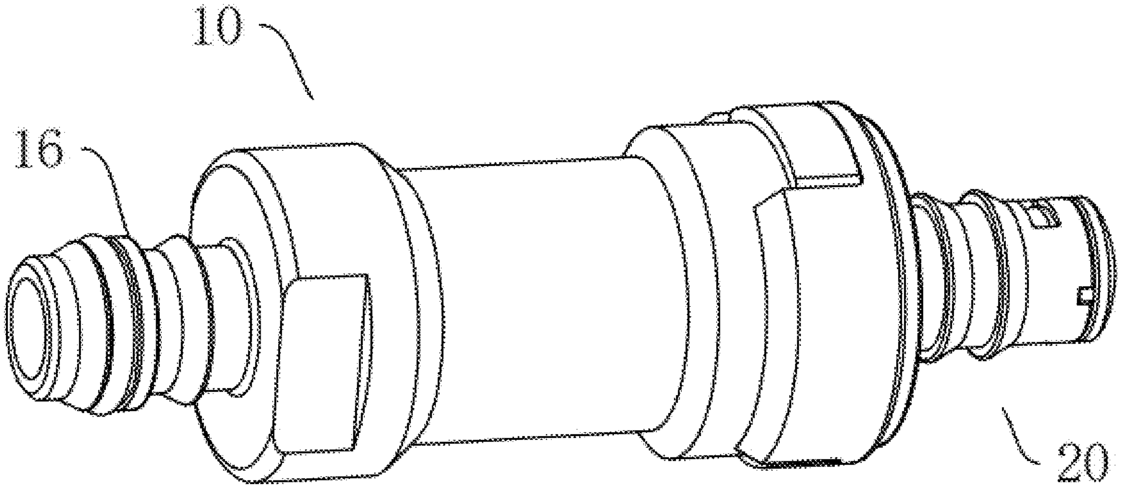
FIG. 1 schematically shows an overall structure of a quick-connect/disconnect fluid connector provided in Embodiment 1.
Figure 2:
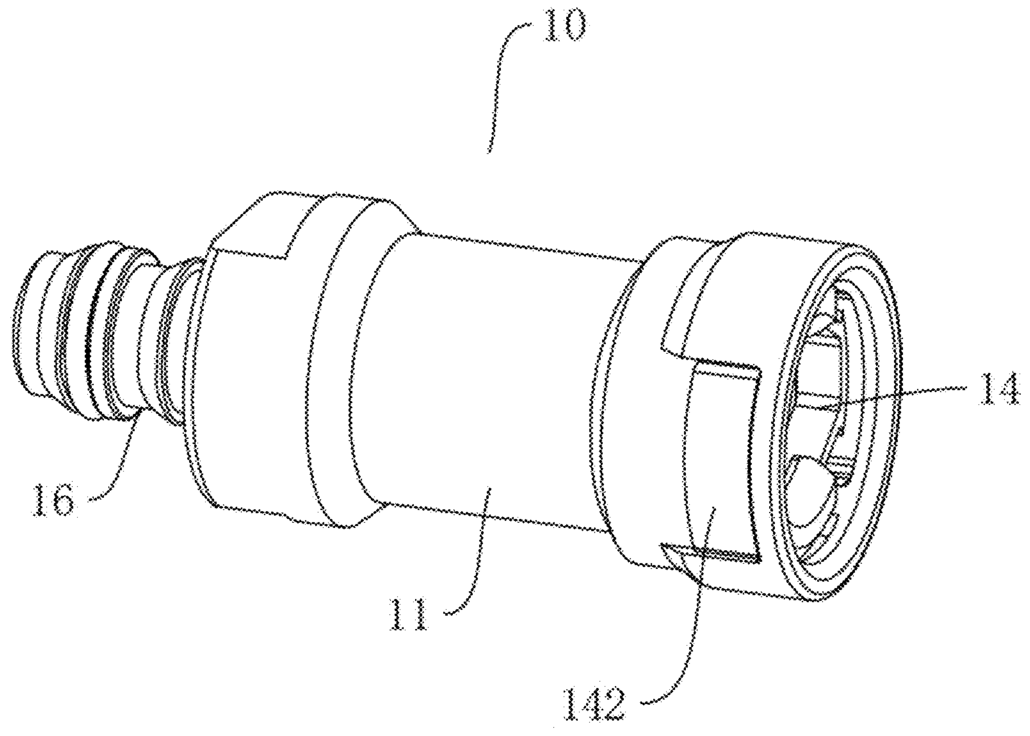
FIG. 2 schematically shows an enlarged structure of a first coupling body in FIG. 1.
Figure 3:
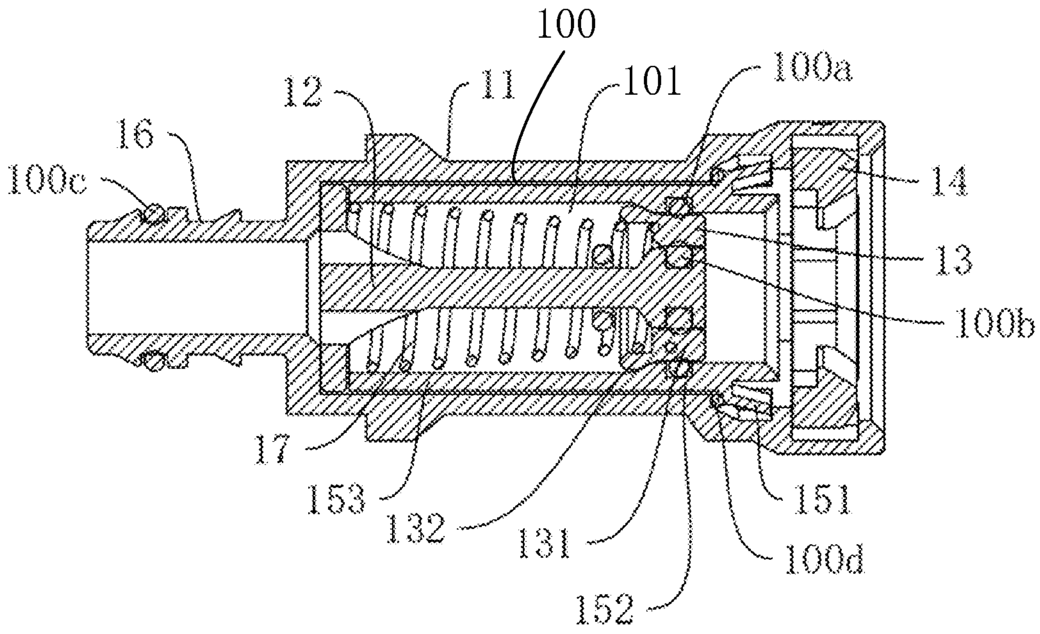
FIG. 3 schematically shows a cross-sectional structure of FIG. 2.
Figure 4:
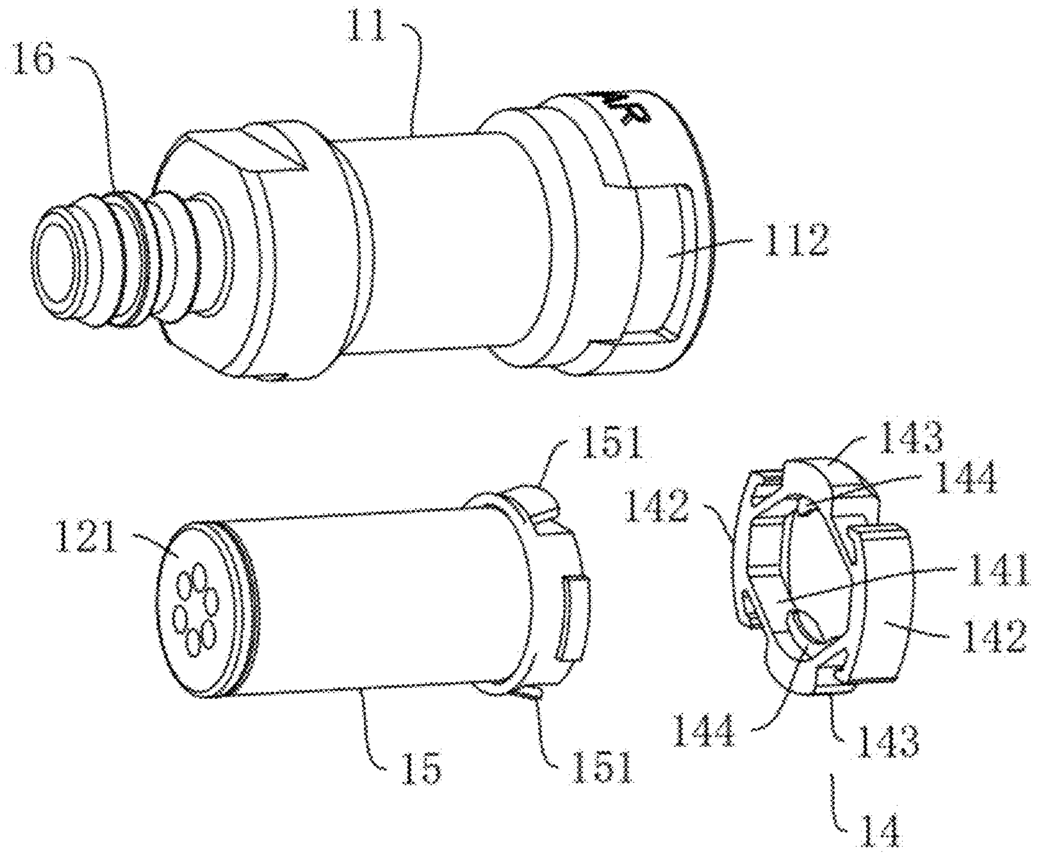
FIG. 4 schematically shows an exploded structure of FIG. 2.
Figure 5:
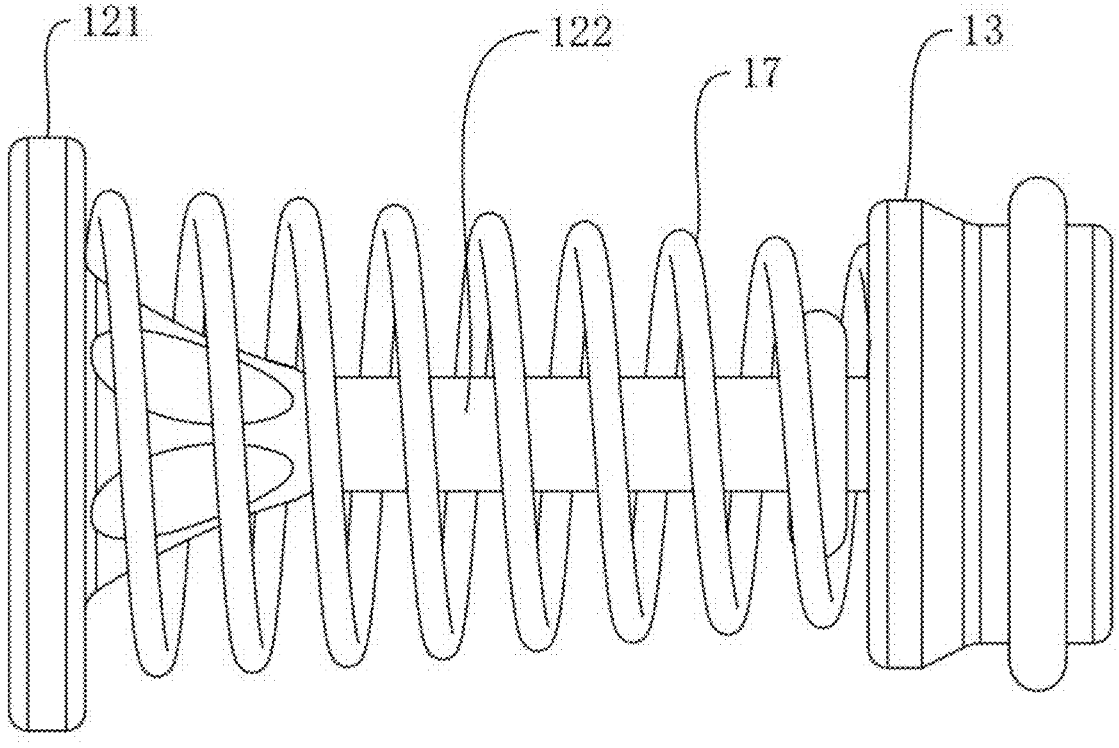
FIG. 5 schematically shows a mating structure of an abutting main body and a sliding main body in FIG. 2.

As shown in FIG. 1, the quick-connect/disconnect fluid connector is mainly composed of a first coupling body 10 and a second coupling body 20 that are mated with each other, forming a socket and plug structure. When the first coupling body and the second coupling body are used independently, they are both closed internally; and after they are mated for insertion, conduction is achieved therebetween.

As shown in FIG. 2 to FIG. 5, the first coupling body 10 includes a first pipe body 11 with a cavity 100 distributed along the axial direction of the first pipe body, an abutting main body 12 and a sliding main body 13 are arranged inside the first pipe body 11, the abutting main body 12 extends along the axial direction of the cavity 100, and the sliding main body 13 is movable inside the cavity 100 along the axial direction of the cavity. An auxiliary pipe body 15 is further arranged inside the cavity 100, one end of the auxiliary pipe body 15 is abutted against the abutting main body 12, the other end of the auxiliary pipe body 15 extends towards an accommodating cavity 101 for formation of an outwardly expanded elastic arm 151 at the end, a connecting groove 111 is provided in the first pipe body 11, the elastic arms 151 is abutted against an interior of the connecting groove 111, and sealing rings IV **100*d*** are filled between the elastic arm and the connecting groove.

Moreover, the first pipe body 11 is internally provided with the accommodating cavity 101 at the end where a second pipe body 21 mates with the first pipe body. An elastic locking body I 14, made of a material such as rubber, is arranged inside the accommodating cavity 101. The locking body I 14 includes a base body 141 with a through hole in the middle, two positioning blocks 142 are arranged on two opposite sides of the base body 141 in a protruding manner, two positioning holes 112 are provided at an end portion of the first pipe body 11, and the positioning holes 112 are configured to accommodate the positioning blocks 142. Two clamping blocks 143 are arranged on another two opposite sides of the base body 141 in a protruding manner, the clamping blocks 143 are abutted against an inner wall of the accommodating cavity 101, two limiting blocks 144 are arranged inside the base body 141, and the positions of the limiting blocks 144 correspond to those of the clamping blocks 143.

The abutting main body 12 includes a base plate 121 and a push rod 122, the base plate 121 abuts against an end portion of the first pipe body 11, one end of the push rod 122 is connected to the base plate 121, and the other end of the push rod 122 passes through the sliding main body 13.

The sliding main body 13 includes a sealing section 131 and a guide section 132, and an outer diameter of the guide section 132 is greater than that of the sealing section 131. The auxiliary pipe body 15 includes a limiting section 152 and a movable section 153, the sealing end is capable of being inserted into the limiting section 152 and fitting with an inner wall of the limiting section 152, while the guide section 132 fits with an inner wall of the movable section 153 and is movable only within the movable section 153. When the sliding main body 13 is within the limiting section 152, it seals the first pipe body 11.

A sealing ring I **100*a* is embedded in the limiting section 152, and a sealing ring II 100*b* is embedded in an end portion of the push rod 122**.

An insertion pipe 16 is arranged in communication with an end of the first pipe body 11 that is away from the accommodating cavity 101, and a sealing ring III **100*c* is sleeved over the insertion pipe 16. A plurality of openings are provided in the base plate 121, and the openings are in communication with the insertion pipe 16. Furthermore, a first spring 17 is sleeved over the push rod 122, and the first spring 17 is retained between the base plate 121 and the sliding main body 13**.

Figure 6:
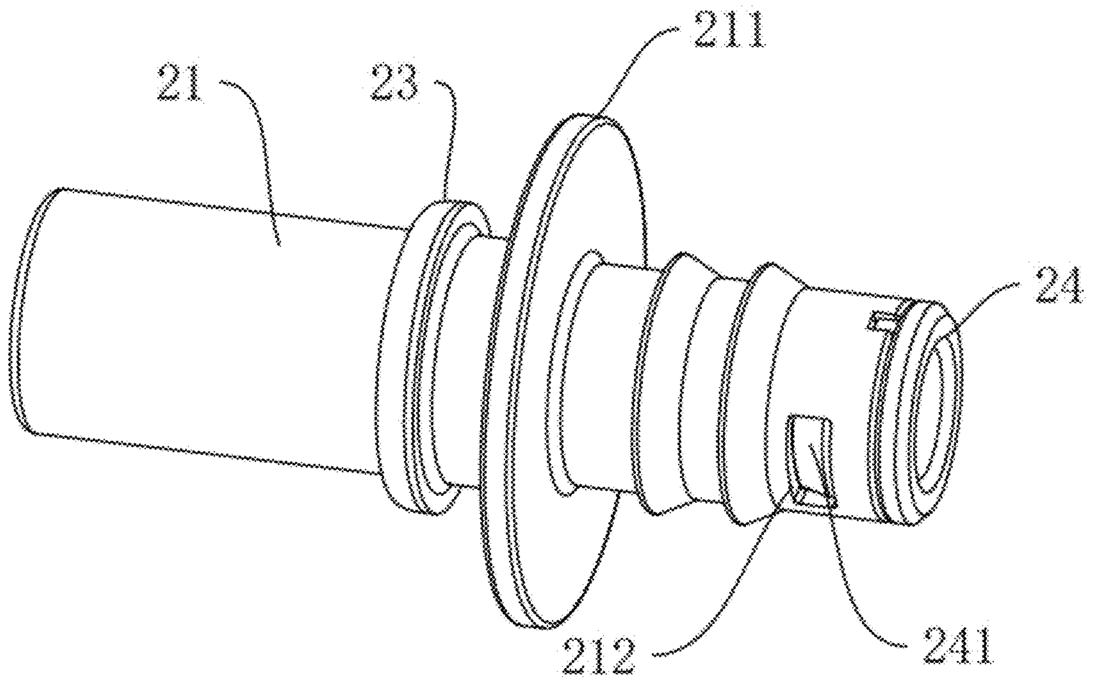
FIG. 6 schematically shows an enlarged structure of the second coupling body in FIG. 1.
Figure 7:
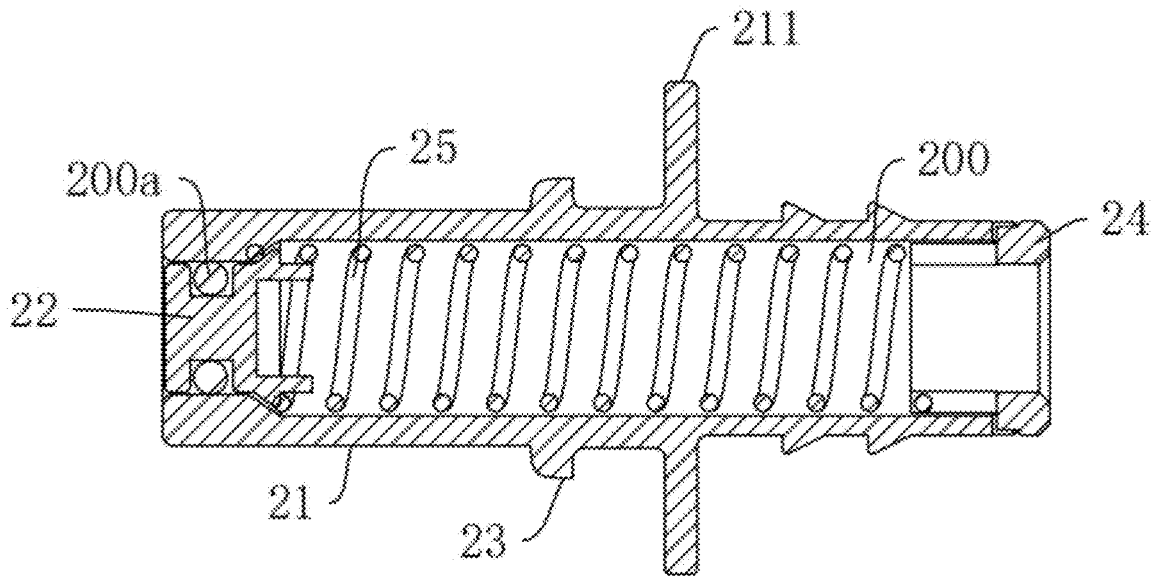
FIG. 7 schematically shows a cross-sectional structure of FIG. 6.
Figure 8:
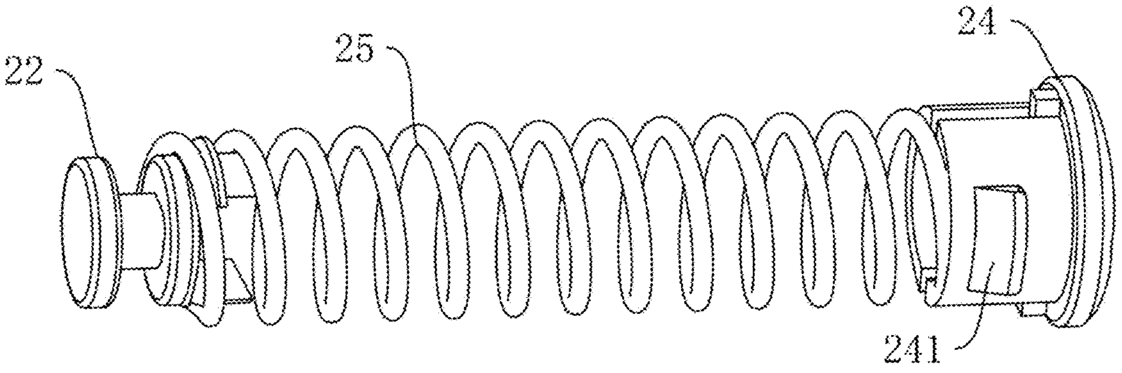
FIG. 8 schematically shows a matching structure of a linkage main body combined with an end cover in FIG. 7.

As shown in FIG. 6 to FIG. 8, the second coupling body 20 includes the second pipe body 21 with a flow channel 200 distributed along the axial direction of the second pipe body, one end of the second pipe body 21 is inserted into the first pipe body 11, a linkage main body 22 is arranged inside the second pipe body 21, a sealing ring V **200*a* is embedded in the linkage main body 22, the linkage main body 22 seals the second pipe body 21 when being located at an end portion thereof, and the abutting main body 12 is capable of pushing the linkage main body 22 to move axially along the flow channel 200**.

A locking body II 23 is arranged on an outer wall of the second pipe body 21, and the locking body II 23 is capable of passing through the locking body I 14 during the insertion of the second pipe body 21 into the first pipe body 11 and is reversely abutted against the locking body I 14, thereby achieving connection and fixation between the first coupling body 10 and the second coupling body 20. Specifically, the locking body II 23 protrudes from and annularly arranged on an outer side of the second pipe body 21, and the locking body II 23 is capable of unidirectionally passing through the limiting blocks 144 and is reversely abutted against the limiting blocks 144.

Furthermore, an end cover 24 is further arranged at the end portion of the second pipe body 21, a second spring 25 is arranged between the end cover 24 and the linkage main body 22, and the linkage main body 22 is constrained from passing through to the outside of the second pipe body 21. A plurality of assembly holes 212 are reserved at one end of the second pipe body 21, the end cover 24 is provided with a plurality of bumps 241, and the assembly holes 212 are configured to accommodate the bumps 241 for quick insertion and fixation.

Furthermore, a disc-shaped stopper 211 is arranged on the outer side of the second pipe body 21 in a protruding manner, and the stopper 211 is capable of abutting against the end portion of the first pipe body 11 and restricting the second pipe body 21 from continuing to move into the first pipe body 11.

Figure 9:
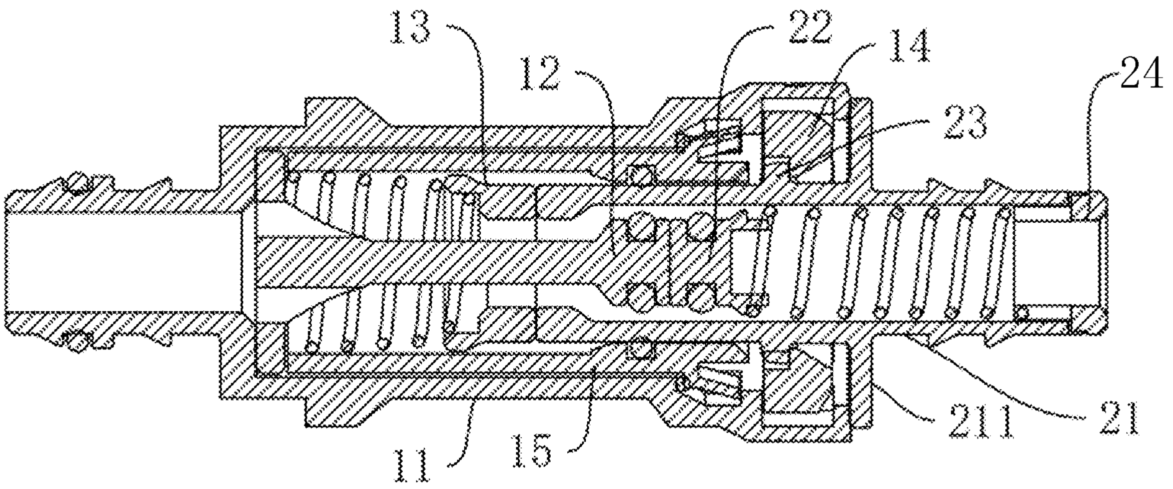
FIG. 9 schematically shows a cross-sectional structure of FIG. 1.

As shown in FIG. 9, when the present disclosure is in use, a left end of the second coupling body 20 is inserted into an opening formed at a right end of the first coupling body 10, and the second pipe body 21 is enabled to continue to advance leftward, overcoming the spring force and pushing the sliding main body 13 into the movable section 153. At the same time, the abutting main body 12 pushes the linkage main body 22 in the second pipe body 21 to overcome the spring force and move rightward until the stopper 211 in the second pipe body 21 abuts against the end portion of the first pipe body 11, and the locking body II 23 has passed through the limiting blocks 144 at this time. After being released, under the acting force of the springs, the locking body II 23 is automatically buckled on the limiting blocks 144 in the reverse direction to achieve connection and fixation between the first coupling body and the second coupling body, so that conduction is achieved therebetween.

The present disclosure describes preferred embodiments, including the best mode known to the inventors for carrying out the present disclosure. Of course, variations from these preferred embodiments will be apparent to those skilled in the art. It is envisioned by the inventors that such variations may be used as appropriate by those skilled in the art, and the inventors point out that the present disclosure may be practiced otherwise than as specifically described herein. Accordingly, the present disclosure includes all modifications encompassed by the spirit and scope of the present disclosure as defined by the appended claims. Moreover, unless otherwise stated or clearly contradicted by the content, the present disclosure includes any of the above factors and all possible variations thereof.

What is claimed is:

1. A quick-connect/disconnect fluid connector, comprising:

a first coupling body, comprising a first pipe body, the first pipe body defining a cavity extending along an axial direction of the first pipe body, wherein an abutting main body and a sliding main body are arranged inside the first pipe body, the abutting main body extending along the axial direction of the cavity, and the sliding main body being movable inside the cavity along the axial direction of the cavity; and a second coupling body, comprising a second pipe body, the second pipe body defining a flow channel extending along an axial direction of the second pipe body, wherein one end of the second pipe body is configured to be inserted into the first pipe body, a linkage main body is arranged inside the second pipe body, and the abutting main body is operative to push the linkage main body to move axially along the flow channel, wherein the first pipe body is defines an accommodating cavity at an end where the second pipe body mates with the first pipe body, an unitary elastic locking body I is arranged inside the accommodating cavity, a locking body II is arranged on an outer wall of the second pipe body, and the locking body II is goperative to pass through the locking body I during the insertion of the second pipe body into the first pipe body and is reversely abutted against the locking body I, thereby achieving connection and fixation between the first coupling body and the second coupling body;

wherein an auxiliary pipe body is further arranged inside the cavity, wherein one end of the auxiliary pipe body abuts against the abutting main body, and another end of the auxiliary pipe body extends towards the accommodating cavity and forms an outwardly expanding elastic arm, wherein a connecting groove is defined in the first pipe body, and wherein the outwardly expanding elastic arm abuts against an interior of the connecting groove.

2. The quick-connect/disconnect fluid connector according to claim 1, wherein the abutting main body comprises a base plate and a push rod, wherein the base plate abuts against an end portion of the first pipe body, one end of the push rod is connected to the base plate, and another end of the push rod passes through the sliding main body.

3. The quick-connect/disconnect fluid connector according to claim 2, wherein the sliding main body comprises a sealing section and a guide section, and wherein an outer diameter of the guide section is greater than that of the sealing section; and the auxiliary pipe body comprises a limiting section and a movable section, the sealing section is operative to be inserted into the limiting section and fit with an inner wall of the limiting section, while the guide section fits with an inner wall of the movable section and is movable only within the movable section.

4. The quick-connect/disconnect fluid connector according to claim 3, wherein a first spring is sleeved around the push rod, and the first spring is retained between the base plate and the sliding main body.

5. The quick-connect/disconnect fluid connector according to claim 4, wherein an end cover is further arranged at an end portion of the second pipe body, a second spring is arranged between the end cover and the linkage main body, and the linkage main body is constrained from passing through to an outside of the second pipe body.

6. The quick-connect/disconnect fluid connector according to claim 5, wherein the locking body I comprises a base body defining a through hole in a middle thereof, wherein two positioning blocks are respectively arranged on two opposite sides of the base body in a protruding manner, two positioning holes are defined at another end portion of the first pipe body, and are configured to accommodate the positioning blocks;

wherein two clamping blocks are respectively arranged on another two opposite sides of the base body in a protruding manner and each abut against an inner wall of the accommodating cavity, wherein the two limiting blocks are arranged inside the base body, and positions of the two limiting blocks correspond to those of the two clamping blocks, respectively; and wherein the locking body II protrudes from and is annularly arranged on an outer side of the second pipe body, and the locking body II is operative to unidirectionally pass through the limiting blocks and reversely abut against the limiting blocks.

7. The quick-connect/disconnect fluid connector according to claim 6, wherein a stopper is arranged on the outer side of the second pipe body in a protruding manner, and the stopper is operative to abut against the other end portion of the first pipe body and preventing the second pipe body from continuing to move into the first pipe body.

8. The quick-connect/disconnect fluid connector according to claim 7, wherein a plurality of assembly holes are defined at the end portion of the second pipe body, and the end cover comprises a plurality of bumps, and wherein the plurality of assembly holes are configured to accommodate the plurality of bumps.

9. The quick-connect/disconnect fluid connector according to claim 2, wherein an insertion pipe is arranged in communication with an end of the first pipe body facing away from the accommodating cavity, wherein a plurality of openings are defined in the base plate, and are in communication with the insertion pipe.

10. The quick-connect/disconnect fluid connector according to claim 1, wherein a fourth seal ring is filled between the elastic arm and the connecting groove.

* * * * *